May 21, 1935.  K. TESSKY  2,002,282
WORKPIECE GUIDE FOR MACHINE TOOLS
Filed March 31, 1934
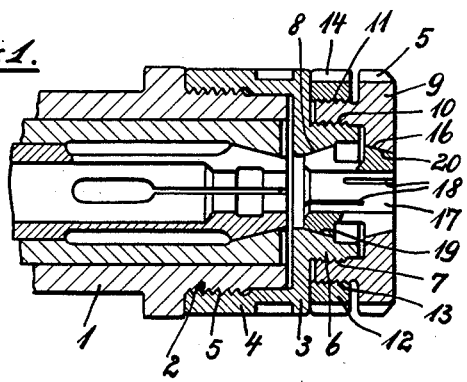
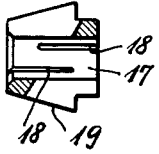
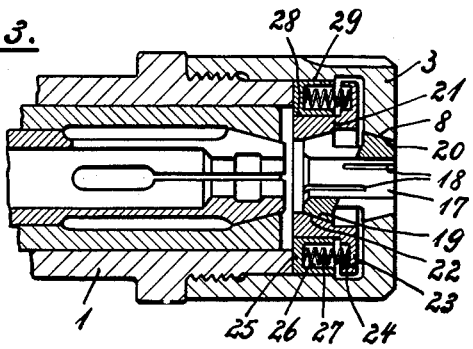
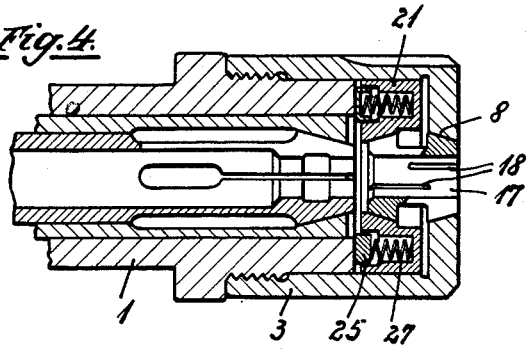
Inventor
Karl Tessky
by Karl Michaelis
Atty.

Patented May 21, 1935

2,002,282

UNITED STATES PATENT OFFICE 2,002,282

WORKPIECE GUIDE FOR MACHINE TOOLS

Karl Tessky, Esslingen-on-the-Neckar, Germany

Application March 31, 1934, Serial No. 718,337
In Germany May 4, 1933

8 Claims. (Cl. 82—39)

My invention relates to workpiece guides for machine tools and more especially to means for guiding bar-shaped cylindrical workpieces in lathes or the like. It has particular reference to tubular guides rotating together with the spindle of the lathe.

Tubular guides of this kind are used instead of the commonly used stationary guide tube when it is essential that the workpiece be cut in an absolutely exact manner. Now the diameter of the bar stock supplied to the lathe varies even if the bars are drawn with very small allowance. In consequence thereof means must be provided for adapting the tubular guide to the varying diameter of the bar stock. To this end it has been suggested to provide guide tubes formed like gripping tongues and combined with adjusting means. However these devices are so long that the bar cannot be consumed completely, the waste pieces having relatively great lengths corresponding to the length of the guide tube and the adjusting device. Besides this the known guide tubes guide the bar only at their front end, so that the wear caused by the cutting pressure is greater in the front zone than in the rear zone. This involves the drawback that the workpiece cannot be guided with sufficient exactness, so that it is impossible to turn it down absolutely centrically.

It is an object of my invention to considerably reduce the length of the workpiece guide and to arrange it within the spindle head, more particularly within the front portion of the nut of the spindle head. In a guide according to my invention the workpiece is guided over the total length of the guide tube.

In a preferred embodiment of my invention the guide tube is shaped symmetrically, so that after being worn down at one end it can be reversed, the front portion which had been subjected to the cutting pressure and to wear, now becoming the rear portion and vice versa, whereby owing to its smaller diameter it will guide the workpiece more accurately. Another advantage of the new workpiece guide consists in the easy and exact centering of the guide tube and the adjusting device.

In the drawing affixed to this specification and forming part thereof several embodiments of my invention are illustrated diagrammatically by way of example.

In the drawing

Fig. 1 is a sectional elevation of the front portion of a lathe spindle and the spindle head provided with a workpiece guide according to my invention.

Fig. 2 is a sectional elevation of a modified embodiment of the guide tube shown in Fig. 1.

Figs. 3 and 4 are sectional elevations of further embodiments.

In all figures similar parts are marked by the same reference numerals.

Referring first to Fig. 1, I is the lathe spindle which is formed at its front end with external thread 2. 3 is the nut on the spindle head comprising two portions of different diameters, the larger portion 4 being formed with an internal thread 5 engaging the thread 2, while the smaller portion 6 is formed with an external thread 7 and an inner conical surface 8. 9 is an adjusting nut formed with internal and external threads 10 and 11, respectively, the internal thread 10 engaging the external thread 7 of the nut 3 of the spindle head. 12 is a counter nut formed with an internal thread 13 engaging the outer thread 11 of the adjusting nut 9. The counter nut 12 abuts against the shoulder which connects the portions 4 and 6 of the nut 3. Both the nuts 3 and 9 are formed with outer toothings 14 and 15, respectively, adapted to be engaged by a suitable key. The adjusting nut is formed with an inner conical surface 16 similar to the conical surface 8 of the nut 3. 17 is the workpiece guide tube formed with slots 18, which render the tube resilient. At its outer circumference the tube 17 is provided with conical surfaces 19 and 20 engaging the conical surfaces 8 and 16, respectively.

The operation of this device is as follows:

The cylindrical bar (not shown) to be cut in the lathe is introduced into the resilient guide tube 17 and is fixed therein by tightening the nuts 9 and 12, nut 9 exerting pressure on the conical surface 20 of tube 17, this pressure being transferred to the conical surfaces 8 and 19 so that the guide tube 17 snugly embraces the workpiece. As can be guessed from the drawing, the tube 17 is very short and the bar is guided exactly, provided only that it is longer than the tube 17. In consequence thereof the length of the waste pieces does not exceed the length of tube 17. In view of its symmetrical form the tube 17 may be reversed after being worn down at its front portion.

In Fig. 2 tube 17 is formed with only one conical outer surface 19, the inner surfaces of the nuts 3 and 9 being shaped correspondingly. The tube here shown is simpler in design than the one shown in Fig. 1. It cannot however be reversed.

This form may be used when the clamping pressures in the front and rear portions of the guiding tube differ.

The guides shown in Figs. 1 and 2 allow adapting the guide tube to the diameter of the bar, but they do not permit to automatically adapt the guide tube to the slight variations of diameter occurring even at distinct points of a single bar. In order to obtain an automatic fitting of the guide tube, resilient means may be provided for automatically pressing the adjusting nut against the guide tube. Devices of this kind are illustrated in Figs. 3 and 4.

Referring first to Fig. 3, the inner conical surface 8 of the nut 3 of the spindle head cooperates with the front conical surface 20 of the guide tube 17, the nut 3 being formed like a cap. The adjusting device comprises an annular member 21 formed with an inner conical wall portion 22 cooperating with the rear conical portion 19 of the tube 17. The annulus 21 is formed with a front flange 23 in which recesses 24 are formed. 25 is a counter annulus formed with recesses 26 which are in alignment with the recesses 24. 27 are compression springs engaging the recesses 24 and 26, respectively, and forcing the annular member 21 with its conical surface 22 against the conical surface 19 of the guide tube 17. The annulus 25 is formed with cylindrical inner and outer walls 28 and 29, respectively, engaging corresponding wall portions provided at the inner surface of the nut 3 and at the outer face of the annular member 21, respectively, so that the annuli 21 and 25 are both centered and axially displaceable.

The operation of the device shown in Fig. 3 is substantially the same as that of the device shown in Fig. 1, except that the readjustment of the guide tube 17 is effected automatically by the springs 27.

In the embodiment shown in Fig. 4 which substantially corresponds to that shown in Fig. 3, the annular member 21 abuts with its outer cylindrical surface against the inner wall of the nut 3, the counter annulus 25 merely forming an abutment for the springs 27.

If the guide tubes 17 are made of steel, the workpiece bars, quite particularly if they are drawn very exactly, may be damaged, because the steel tube will always produce grooves or flutes in the outer surface of the bar owing to the feeding movement between the bar and the tube. In order to avoid this I make the guide tube 17 of a suitable sufficiently resilient and sufficiently hard metal other than iron, for instance of a hard resilient bronze metal.

In the embodiments described above the guide tube is shown as being mounted in the spindle head. It should, however, be understood that, if desired, the guide tube might also be mounted in a separate bearing arranged in front of the spindle, a suitable driver being provided for driving the bearing in correspondence with the movement of the spindle.

I wish it to be understood that I do not desire to be limited to the exact details of construction shown and described for obvious modifications will occur to a person skilled in the art.

I claim:—

1. In a machine tool in combination a tubular spindle, a spindle head mounted on said spindle, a short workpiece guide and means for adjusting said guide to the diameter of the workpiece, both said guide and said adjusting means being accommodated within the front portion of said spindle head.

2. In a machine tool in combination a tubular spindle, a spindle head mounted on said spindle, a workpiece guide and cooperative means associated with said guide and said head, respectively, for adjusting said guide to the diameter of the workpiece, both said guide and said adjusting means being accommodated within the front portion of said spindle head.

3. In a machine tool in combination a tubular spindle, a spindle head mounted on said spindle, a symmetrical reversible workpiece guide and means for adjusting said guide to the diameter of the workpiece, both said guide and said adjusting means being accommodated within the front portion of said spindle head.

4. In a machine tool in combination a tubular spindle, a spindle head mounted on said spindle, a workpiece guide formed with an at least partly conical outer surface, means for adjusting said guide to the diameter of the workpiece and a hollow conical member forming part of said adjusting means and engaging the conical portion of the outer surface of said guide, both said guide and said adjusting means being accommodated within the front portion of said spindle head.

5. In a machine tool in combination a tubular spindle, a spindle head mounted on said spindle, a workpiece guide formed with an at least partly conical outer surface, and means for adjusting said guide to the diameter of the workpiece, both said guide and said adjusting means being accommodated within the front portion of said spindle head, said adjusting means comprising a body and a hollow conical member engaging each other with cylindrical surfaces, said member engaging the conical portion of the outer surface of said guide.

6. In a machine tool in combination a tubular spindle, a spindle head mounted on said spindle, a workpiece guide within said head being formed with an at least partly conical outer surface, and means for adjusting said guide to the diameter of the workpiece, both said guide and said adjusting means being accommodated within the front portion of said spindle head, said adjusting means comprising a body and a hollow conical member engaging the conical portion of the outer surface of said guide, said body engaging said spindle head.

7. In a machine tool in combination a tubular spindle, a spindle head mounted on said spindle, a workpiece guide within said head being formed with an at least partly conical outer surface, means for adjusting said guide to the diameter of the workpiece, a movable hollow conical member forming part of said adjusting means and engaging the conical portion of the outer surface of said guide, and resilient means for pressing said guide and said member against each other.

8. In a machine tool in combination a tubular spindle, a spindle head mounted on said spindle, a short workpiece guide, formed of a hard metal other than steel, and means for adjusting said guide to the diameter of the workpiece, both said guide and said adjusting means being accommodated within the front portion of said spindle head.

KARL TESSKY.